United States Patent [19]

Haws

[11] 4,003,193
[45] Jan. 18, 1977

[54] STALK SELECTIVE HARVESTING MACHINE

[76] Inventor: Spencer Kim Haws, 88 W. 50 South, Centerville, Utah 84014

[22] Filed: Mar. 14, 1975

[21] Appl. No.: 558,349

[52] U.S. Cl. .................................................. 56/327 A
[51] Int. Cl.² ............................................... A01D 45/00
[58] Field of Search .................... 56/327 A, 13.6; 172/534, 82, 84–88, 54, 38; 47/1.43; 171/58, 62, 38, 55, 56

[56] References Cited

UNITED STATES PATENTS

| | | | |
|---|---|---|---|
| 2,690,043 | 9/1954 | Marihart | 56/327 A |
| 2,767,544 | 10/1956 | Turkington | 56/327 A |
| 2,791,878 | 5/1957 | Kepner | 56/327 A |
| 3,402,507 | 9/1968 | Tschudy, Jr. | 47/1.43 |
| 3,447,292 | 6/1969 | Rehmke | 56/327 A |
| 3,658,136 | 4/1972 | Ernst | 172/54 |

*Primary Examiner*—Russell R. Kinsey
*Attorney, Agent, or Firm*—Criddle, Thorpe & Western

[57] ABSTRACT

A machine for harvesting crops which grow as stalks or spears such as asparagus. The machine includes a frame having wheels to carry the frame along the ground, a stalk sensing mechanism for sensing stalks of a predetermined height in a certain pathway, and a cutting mechanism which is rotated into a cutting position beside each stalk sensed by the sensing mechanism. When it reaches the cutting position, a portion of the cutting mechanism is moved transversely of the pathway to cut the stalk below ground level. Substantially simultaneously with the cutting of a stalk, a grasping mechanism seizes the stalk and, coincident with the rotation of the cutting mechanism, carries the stalk to a holding bin.

33 Claims, 10 Drawing Figures

STALK SELECTIVE HARVESTING MACHINE

BACKGROUND OF THE INVENTION

This invention relates to a machine for selectively harvesting asparagus stalks and the like.

A variety of apparatus have been suggested for facilitating the automated harvesting of asparagus. See, for example, U.S. Pat. Nos. 2,709,330; 2,767,544; 3,176,456; 3,328,943; 3,412,540 and 3,653,194. The result sought with most suggested arrangements is to harvest only certain mature stalks while leaving undisturbed the younger stalks. The harvesting of asparagus, since it is typically planted in ordered, parallel beds or rows, would appear to be suited for automation but the suggested arrangements, although eliminating much of the manual labor, generally cause some damage to the unharvested stalks growing near those that are harvested. This is because the cutting elements in such arrangements are positioned and dispatched to cut a selected stalk in such a way that adjacent stalks are either also cut or are partially mutilated. This, of course, is costly and serves to defeat one of the purposes for seeking to automate harvesting in the first place —that of reducing the cost per unit of crop harvested.

SUMMARY OF THE INVENTION

It is an object of the present invention to provide a machine for automatically and selectively harvesting stalks of asparagus and the like.

It is another object of the present invention to provide such a machine which is adapted to cut a selected stalk without damaging adjacent stalks.

It is a further object of the present invention, in accordance with one aspect thereof, to provide such a machine which, after cutting a stalk, gently loads the stalk into a bin or other holding structure.

It is still another object of the invention, in accordance with another aspect thereof, to provide such a machine which includes an adjustable mechanism for detecting stalks of preselectable height in a preselectable pathway and for actuating a cutting mechanism to cut the stalks.

BRIEF DESCRIPTION OF THE DRAWINGS

The above and other objects, features and advantages of the present invention will become clear from the following detailed description presented in connection with the accompanying drawings in which.

DETAILED DESCRIPTION

Figure 1:
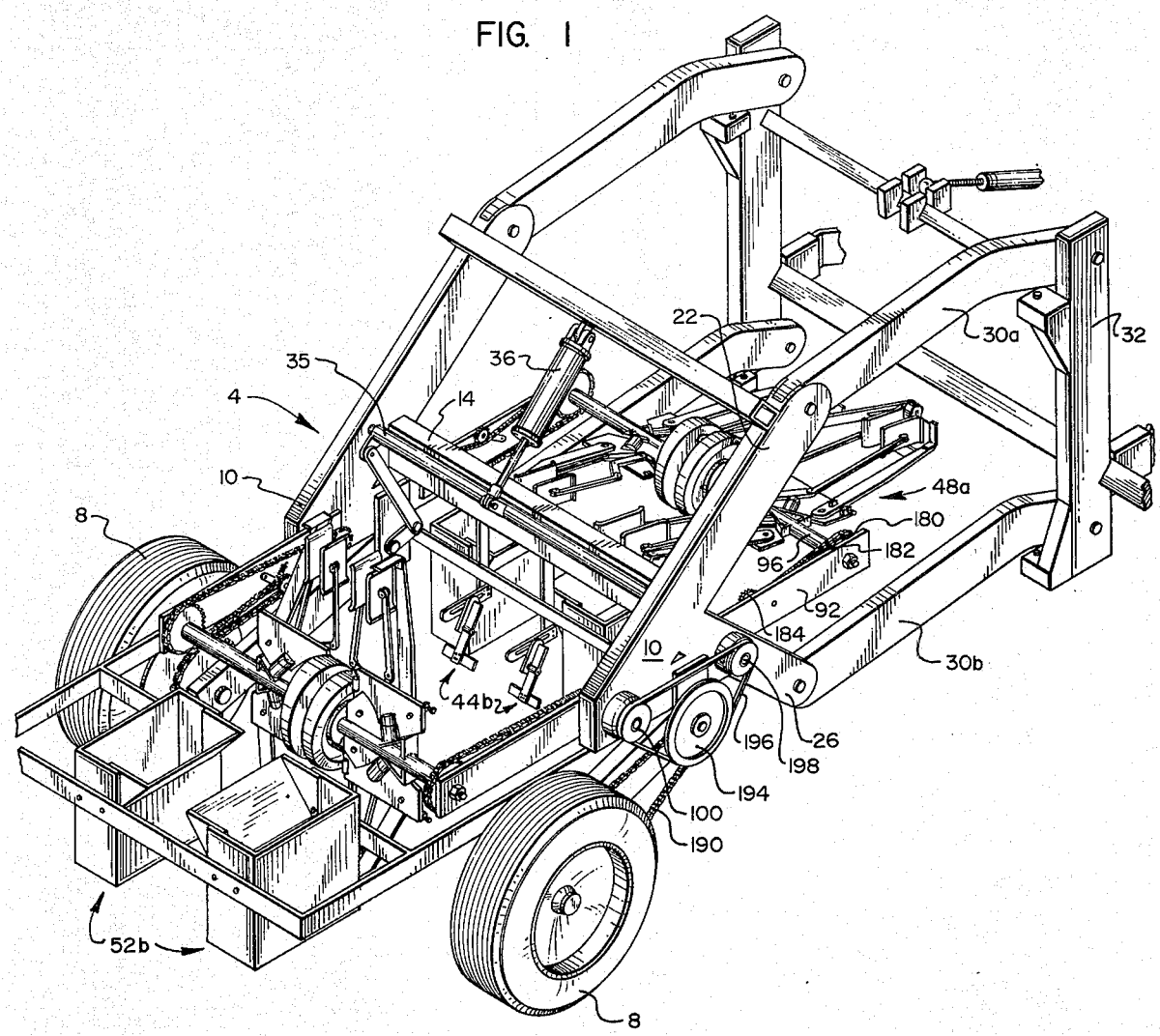
FIG. 1 is a perspective view of a harvesting machine made in accordance with the principles of the present invention.
Figure 2:
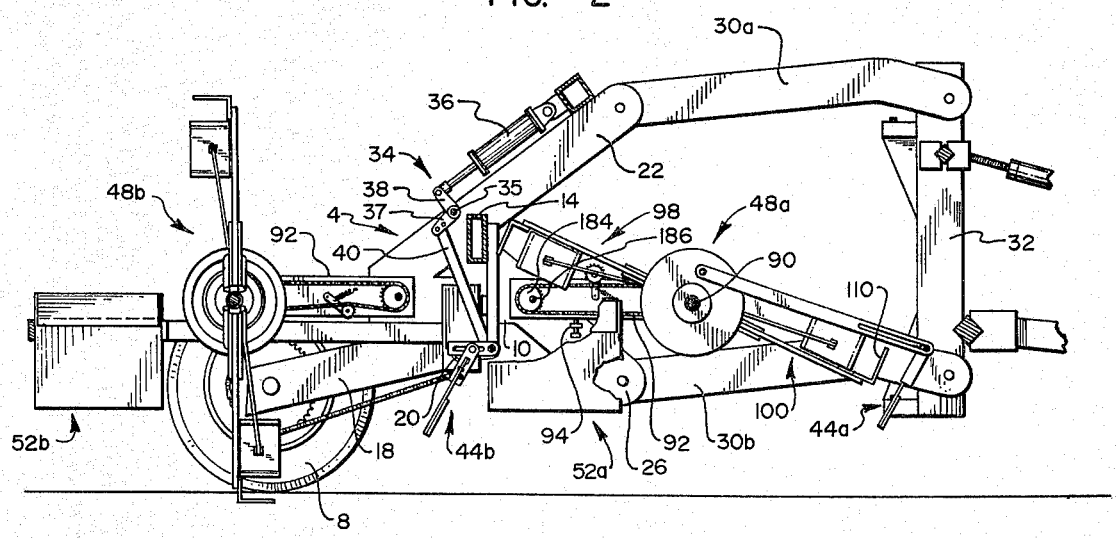
FIG. 2 is a side elevational view of the harvesting machine of FIG. 1.
Figure 3:
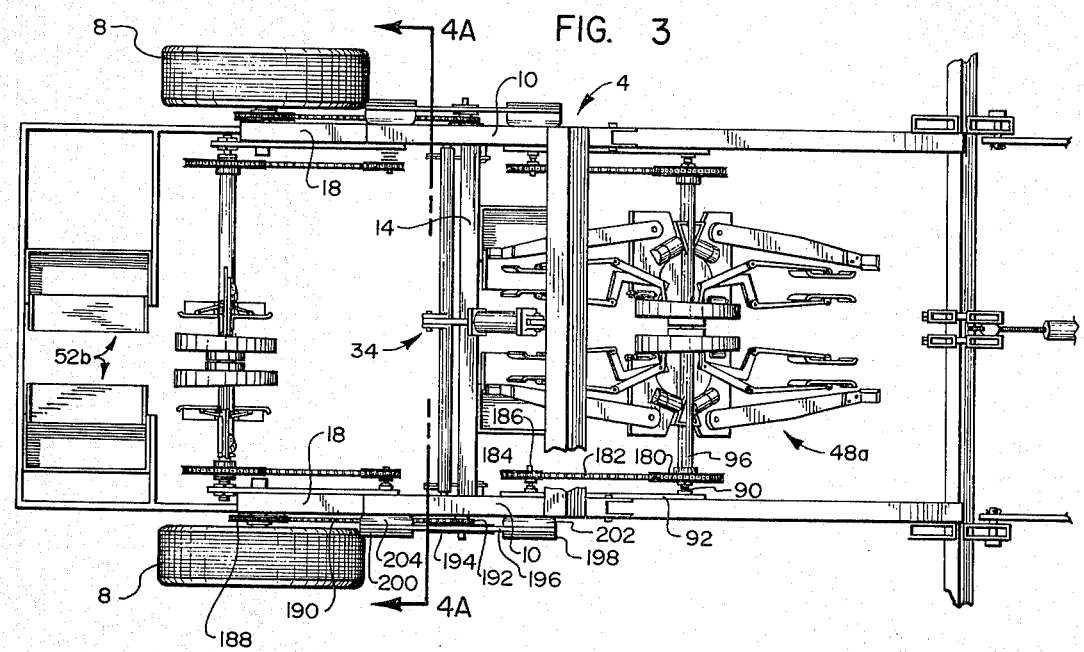
FIG. 3 is a top plan view of a portion of the harvesting machine of FIG. 1.

Referring to FIGS. 1 through 3, there is shown an illustrative embodiment of a harvesting machine suitable for carrying out the objects of the invention. This machine includes a frame 4 supported and carried by two wheels 8. The frame 4 includes a pair of spaced-apart triangularly-shaped support members 10 from which extend various support beams for the wheels 8 and other components of the machine. As best seen in FIG. 3, the support members 10 are joined by a rigid cross member 14. Wheel support beams 18 are pivotally mounted to extend downwardly and rearwardly of corresponding support members 10, with the wheels 8 being journaled at the lower ends of the support beams 18.

The harvesting machine shown in FIGS. 1 through 3 is adapted for being towed by some type of towing vehicle such as a tractor. It is desirable that as the machine is being towed through a field of asparagus or similar stalk producing crop, portions of the machine be maintained substantially level. To accomplish this, the support members 10 are each provided with vertically-spaced extensions 22 and 26 each of which is, in turn, coupled to a corresponding connecting arm 30a or 30b (FIG. 2). The connecting arms 30a and 30b are attached to a rigid, vertically disposed towing frame 32 mounted on a tractor so that the horizontal displacement of each connecting arm is maintained substantially constant with respect to the other connecting arms during the harvesting operation. The effect of this is to provide a type of parallel linkage between the harvesting machine and the towing vehicle to maintain the support members 10 in a substantially level disposition regardless of the contour of the ground over which the harvesting machine is being towed. This, of course, assumes that the towing vehicle will be maintained substantially level. The wheel support beams 18 are pivotally mounted at 20 to the support members 10 by any suitable structure.

A pneumatic piston actuated linkage 34 is coupled to the wheel support beams 18 for raising or lowering the wheels 8 relative to the frame 4 in response to operation of pneumatic piston 36. Such linkage 34 includes a finger 38 mounted to a rod 35 which, in turn, is pivotally mounted on extension beam 22. The end of the finger 38 is coupled to the protruding end of the piston rod of the piston 36. Another finger 37 is also mounted to rod 35 and is coupled to one end of a connecting bar 40. The other end of the connecting bar 40 is coupled to the end of the wheel support beam 18 opposite the end on which the wheel 8 is mounted. It is apparant from FIG. 2 that operation of the piston 36 will cause the support beam 18 to either raise or lower.

Although a specific structure has been described for the basic frame of the harvesting machine — a structure which provides certain leveling advantages — it will be recognized that other frame configurations could also be provided for supporting and carrying the remaining elements of the machine to next be discussed.

The elements of the harvesting machine for carrying out the harvesting operation generally include stalk sensing or detecting apparatus 44a and 44b, cutting assemblies 48a and 48b which include both cutting mechanisms and stalk grasping mechanisms, and stalk receiving and holding structure 52a and 52b. Each cutting assembly 48a and 48b is associated with a corresponding stalk detecting apparatus 44a and 44b and stalk receiving and holding structure 52a and 52b. As shown in FIGS. 1 through 3, the harvesting machine includes four sets of detecting, cutting and holding means. However, either more or less such sets of harvesting elements could be provided depending upon the desires and needs of the user. As best seen in FIG. 3, each of the sets of equipment is offset or staggered from every other set to accommodate the harvesting of stalks in four portions of a row of the crop being harvested or in four separate rows, and, as will be described, each set operates independently of the others.

Figure 5A:
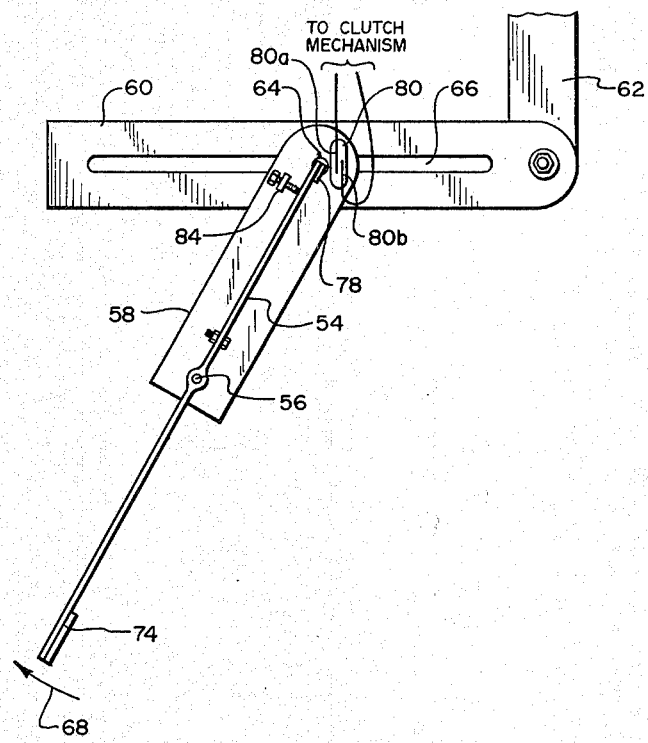
FIG. 5A shows a side elevational view respectively of the stalk detecting apparatus of the harvesting machine of FIG. 1.
Figure 5B:
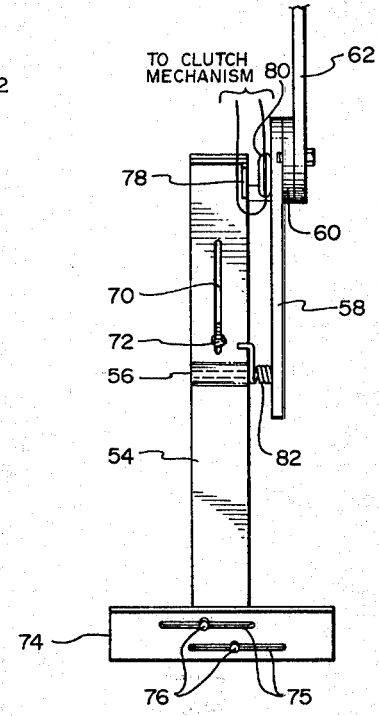
FIG. 5B shows a front elevational view of the stalk detecting apparatus of the harvesting machine of FIG. 1.

Each stalk detecting apparatus 44a and 44b is mounted to a part of the frame 4 at a position in front of a corresponding cutting assembly 48a and 48b detect stalks of a predetermined height and to then activate the corresponding cutting assembly to cut and gather the detected stalks. Referring now to FIGS. 5A and 5B, there is shown respectively side and front views of the detecting apparatus 44b of FIG. 2. The detecting apparatus includes a detection arm 54 mounted to pivot about a generally horizontal axis 56. The detecting arm 54 is mounted on a support plate 58 which, in turn, is adjustably mounted on a support bar 60. The support bar 60 is pivotally mounted to another support bar 62. The support plate 58 is held in place on the support bar 60 by a bolt 64 inserted through the plate 58 and through a slot 66 in the bar 60. The plate 58 may be moved fore or aft on the support bar 60 to vary the distance between the detecting arm 54 and a corresponding cutting assembly (not shown in composite FIG. 5) and to thereby establish the appropriate distance for precisely cutting the particular stalks detected by the detecting apparatus. The support bar 60 may also be pivoted upwardly or downwardly on support bar 62 to thereby raise or lower the detecting apparatus.

The detection arm 54 is pivotally mounted at a point along its length so that a fairly light force applied at its lower end will cause the arm, and in particular the lower part of the arm, to pivot from generally offset vertical rest position rearwardly toward an actuate position as indicated by the arrow 68 in FIG. 5A. Thus when a stalk is presented in the path of the direction of movement of the detecting apparatus (the direction of movement being to the right in FIG. 5A) the lower part of the detection arm 54 contacts the stalk and, as the harvesting machine moves forward, is caused to pivot rearwardly.

The detection arm 54 includes a slot 70 in which is secured a bolt and nut 72. By adjusting the position of the bolt and nut 72 in the slot 70, the force on the lower part of the detection arm 54 necessary to cause the arm to pivot can be varied. The bolt and nut 72, in effect, serve as an adjustable balancing weight.

Attached to the lower part of the detection arm 54 is a feeler plate 74 which, by reason of a pair of slots 75 located therein and a pair of screws 76 for securing the plate 74 to the arm 54, may be adjusted in the transverse direction. Thus, with the provision of the slots 75 in the feeler plate 74, the slot 66 in the support bar 60, and the pivot mounting of the bar 60, the ultimate position of the feeler plate 74 with respect to the harvesting machine may be varied in the vertical, lateral and forward/rearward directions. This is advantageous since multiple detecting apparatus on a machine can be adjusted to accommodate the particular rows of the crop being harvested.

At the upper end of the detection arm 54, a magnet 78 is mounted. This magnet is provided to actuate a magnetically responsive switch 80 which is mounted on the support plate 58 beside the path traversed by the magnet 78 when the detection arm 54 is pivoted toward the actuate position. As the magnet 78 moves past the switch 80, the contacts 80a and 80b of the switch are caused to close to thereby supply a signal to the corresponding cutting assembly and in particular to a clutch mechanism to be described. The contact elements 80a and 80b are enclosed in a sealed glass container to preserve the life of the contacts and prevent the contacts from collecting dirt and dust, etc. Such magnetically operated switches are well known in the art.

A return spring 82 is mounted on the support plate 58 to engage the detection arm 54 and cause it to return to the slightly offset vertical rest position following any pivoting of the arm. A stop 84, mounted on the support plate 58, is provided to prevent the detection arm 54 from pivoting beyond the rest position on the return movement of the arm. The stop 84 consists simply of a screw inserted in a threaded opening in a flange extending from the support plate 58.

Referring again to FIGS. 1 through 3, the cutting assemblies 48a and 4b are shown to include a horizontally disposed shaft 90 extending between and supported by a pair of support arms 92. (Hereafter, only one cutting assembly 48, support arm 92, etc. will be described, it being understood that the other cutting assemblies, support arms, etc., are constructed and operate in a fashion similar to that described.) The shaft 90 is fixed in one end of the support arm 92, the other end of the support arm 92 being pivotally mounted on the support member 10. The support arm 92 is prevented from pivoting downward beyond a certain point by a stop 94 attached to the support member 10 but is free to pivot upwardly from that position. Thus, if a portion of the cutting assembly 48a strikes a rock or other object protruding from the ground, the assembly is free to pivot upwardly and move out of the way of such object to thereby avoid damage to the assembly.

Figure 4A:
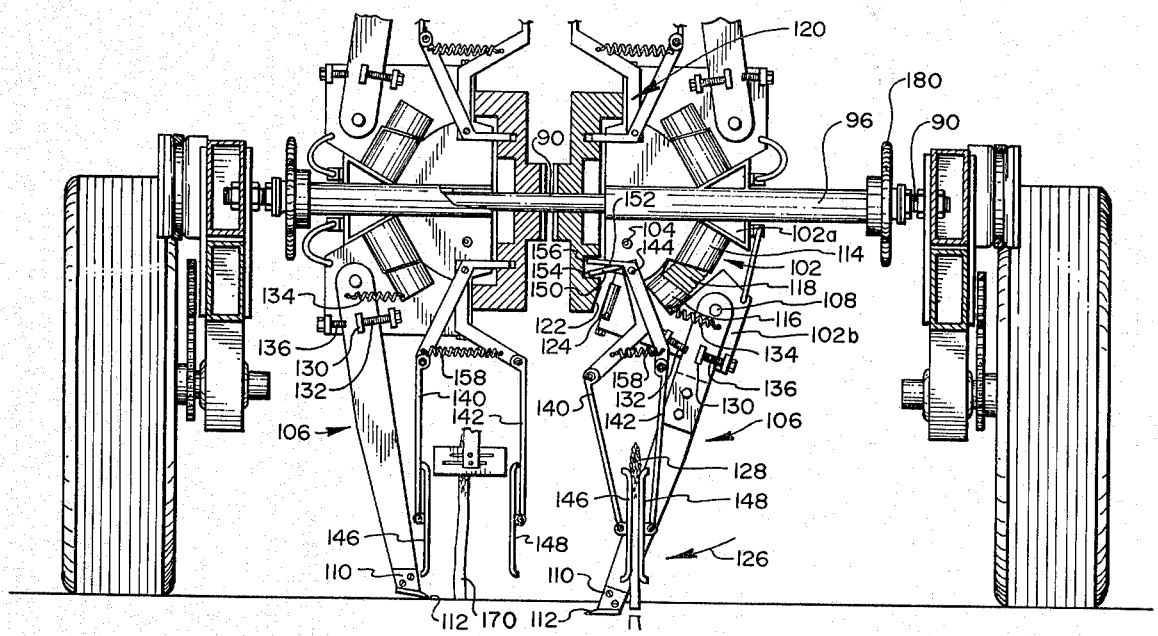
FIG. 4A is a front elevational view showing the cutting assembly of the harvesting machine of FIG. 1.

A sleeve or hub 96 (FIG. 3) is rotatably disposed about the shaft 90 and carries most of the remaining elements of the cutting assembly 48a. Mounted on and extending radially outwardly from the sleeve 96 are two cutting arms 98 and 100 (FIG. 2). Referring now to FIG. 4A, (which shows two cutting assemblies side by side, each with one cutting arm only), each cutting arm includes a mounting plate 102, one portion 102a of which is rigidly mounted on the sleeve 96 and the other portion 102b of which is pivotally mounted on portion 102a to pivot about a generally horizontal axis 104 transversely of the direction of travel of the harvesting machine. Portion 102b of the mounting plate 102 carries an elongated cutting member 106 which itself is mounted to pivot about a generally horizontal axis 108.

The end of the cutting member 106 opposite the end which is pivotally mounted to the portion 102b of the mounting plate 102 carries a cutting blade 110. As best seen in FIG. 2, this cutting blade 110 extends laterally from one side of the cutting member 106. The cutting blade 110 is sharpened on one edge 112 (FIG. 4) to cut the stalks to be harvested.

The cutting member 106 is composed of two pieces affixed together so that one piece may be adjusted longitudinally with respect to the other piece. This is accomplished by simply providing a slot in one of the pieces of the cutting member and bolts for insertion through the slot to secure the other piece so that the bolts may be moved in the slot to thereby vary the overall length of the cutting member 106.

Sockets 114 and 116 are formed in portions 102a and 102b respectively of the mounting plate 102 to hold a coil spring 118. The coil spring 118 operates to urge the portion 102b of the mounting plate 102 to pivot downwardly about the pivot axis 104. The pivoting action of the portion 102b of the mounting plate is controlled by a cam 120 which is mounted in fixed position on the shaft 90. In particular, a cam track 122 of the cam 120 coacts with a camming roller 124 mounted on the lower portion 102b of the mounting plate 102 to control the degree to which the portion 102b and thus the cutting member 106 are pivoted.

A shoulder 123 (FIG. 4B) is provided in the camming track 122 of the cam 120 at a location to cause the portion 102b of the mounting plate 102 to abruptly and rapidly pivot downwardly carrying the cutting member 106 inwardly as indicated by the arrow 126 in FIG. 4A (and transversely of the direction of movement of the harvesting machine). The cutting member 106 thus carries the cutting blade 110 inwardly and also downwardly below ground level to sever a stalk of asparagus or similar crop 128.

At the start of a cutting stroke, a stop 130 mounted on and extending outwardly of the cutting member 106 is biased against an inner adjusting bolt 132 by a spring 134 as shown for the leftmost cutting assembly of FIG. 4A. The bolt 132 is mounted on portion 102b of the mounting plate 102. As the portion 102b of the mounting plate 102 is pivoted downwardly, the stop 130 continues to rest against the adjusting bolt 132 until the cutting blade 110 of the cutting member 106 contacts the ground. When this occurs, the portion 102b continues to pivot downwardly and inwardly forcing the blade 110 into the ground, the cutting member 106 to pivot outwardly relative to portion 102b, and the stop 130 to contact an outer adjusting bolt 136 also mounted to portion 102b (see FIG. 4A). Contact of the outer adjusting bolt 136 by the stop 130 causes the cutting member 106 to be carried inwardly toward the stalk 128 so that the cutting blade 110 may cut the stalk. Provision of the pivotal mounting of the cutting member 106 and the adjusting bolts 132 and 136 results in the cutting member 106 being initially carried downwardly into the ground and then inwardly toward a stalk during each cutting stroke. The adjusting bolts 132 and 136 allow for varying the point at which inward movement of the cutting member 106 begins and the depth to which the cutting member is forced into the ground prior to its inward movement.

The cutting assembly 48 also includes apparatus for grasping a stalk prior to the stalk being cut. The apparatus consists of a pair of holding plate arms 140 and 142 pivotally mounted on portion 102b of the mounting plate 102 to pivot about a common axis 144. At the lower end of each holding plate arm 140 and 142 is mounted a holding plate 146 and 148. The holding plate arms 140 and 142 each include laterally extending camming fingers 150 and 152 respectively which, for a portion of rotation of the mounting plate 102, maintain contact with a second and third camming track 154 and 156 respectively of the cam 120. The camming tracks 154 and 156 control the pivoting action of the holding plate arms 140 and 142 respectively and therefore the transverse movement of the holding plates 146 and 148. A spring 158 joining the holding plate arms 140 and 142, biases the holding plate arms so that the corresponding camming fingers 150 and 152 maintain contact with the corresponding camming tracks 154 and 156.

Figure 4B:
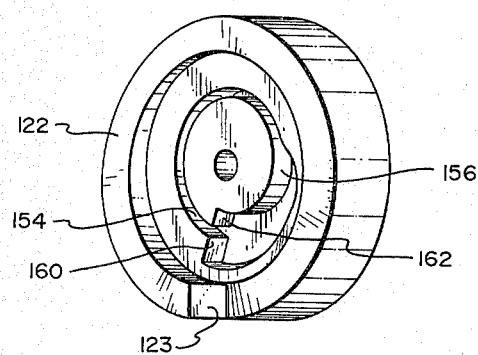
FIG. 4B shows an enlarged perspective view of the cam 120 of FIG. 4A.

FIG. 4B shows a perspective of the cam 120 of FIG. 4A showing the various camming tracks. As there shown, the camming tracks 154 and 156 are close together over a significant portion of the distance around the cam 120. Over this portion, the camming fingers 150 and 152 are maintained together between the tracks as illustrated by the leftmost cutting assembly of FIG. 4A. When the camming fingers are maintained together, the plate holding arms 140 and 142 are maintained apart as also illustrated by the leftmost cutting assembly of FIG. 4A.

The camming tracks 154 and 156 each include oppositely directed shoulders 160 and 162 (FIG. 4B) to enable the camming fingers 150 and 152 to pivot or spread apart when the fingers reach the shoulder as illustrated by the righmost cutting assembly of FIG. 4A. Of course, when the fingers 150 and 152 spread apart, the holding plate arms 140 and 142 move together to grasp a stalk therebetween as shown with the righmost cutting assembly of FIG. 4A.

When the camming fingers cam over the shoulders 160 and 162, the camming tracks 154 and 156 are sufficiently far apart at that point and for about 20° around the cam thereafter that the plate holding arms 140 and 142 may pivot freely about the pivot point 144 (FIG. 4A). This is a worthwhile feature since the plate holding arms 140 and 142 may thus close upon and grasp a stalk positioned within a predetermined transverse range in the crop row. That is, the holding plate arms may pivot to grasp a stalk on the outside, middle or inside of a portion of a crop row being harvested and because the holding plate arms pivot freely after the respective camming fingers 150 and 152 cam over the shoulders 160 and 162, the stalk grasped is not prematurely broken off.

In operation, the cutting assemblies 48a and 48b are maintained in a rest position until actuated to rotate by the detection of a stalk of appropriate height by the stalk detecting apparatus 44a and 44b. The forwardmost cutting assembly 48a shown in FIG. 2 is in the rest position with the cutting arms extending in opposite directions slightly rotated from a horizontal orientation. When the cutting assembly is actuated, it rotates to a so-called cutting position in which one of the cutting arms extends generally vertically downwardly toward the ground (the rearmost cutting assembly 48b shown in FIG. 2 is in the cutting position). As best shown by the leftmost cutting assembly in FIG. 4A, the cutting member 106 is rotated downwardly to the cutting position to the side of a stalk 170 to be harvested. Upon reaching the cutting position, the holding plate arms 140 and 142 are caused to move together on either side of the stalk so that the holding plates 146 and 148 firmly grasp the stalk (see the rightmost cutting assembly of FIG. 4A). Shortly thereafter the cutting member 106 is caused to move toward the stalk for severing it as illustrated in FIG. 4A. In particular, the operation of the cam tracks 154 and 156 and the shoulders 160 and 162 of the camming tracks on the camming fingers 150 and 152 causes the holding plate arms 140 and 142 to move together to grasp a detected stalk. Then, the operation of the cam track 122 and shoulder 123 on the camming roller 124 of the mounting plate portion 102b causes the portion 102b and the cutting member 106 to abruptly and rapidly move inwardly carrying the cutting blade 110 below ground level to cut the detected stalk. Note that the cutting of the stalk occurs after the stalk has been grasped by the holding plates 146 and 148 and is therefore under control.

Rotation of the cutting arms into position beside a detected stalk to be harvested and the subsequent movement of the cutting arms transversely of the direction of movement of the harvesting machine to sever the stalk avoids significant damage to other stalks in the rows along which the harvesting machine is being towed. Of course, some stalks growing to the side of a stalk to be harvested could be inadvertently severed but stalks ahead of and behind the stalk in question would generally be left undisturbed.

After the severing of a stalk, the cutting assembly 48 continues to rotate from the cutting position toward the next rest position. Deposit of the harvested stalk in a receiving and holding bin will be described later.

As shown in FIGS. 1 and 3, a sprocket or pulley 180 is mounted at one end of the sleeve 96 to rotate therewith. The sprocket 180 is coupled by way of a drive chain or belt 182 to a control sprocket or pulley 184 which is mounted on a shaft 186. The shaft 186 is journaled to rotate in the support member 10. The control sprocket 184 is mounted on the shaft 186 to rotate eccentrically (see FIGS. 2 and 3) when the shaft 186 is rotated. The effect of this is that during one complete rotation of the control sprocket 184, the sprocket 180 and thus the cutting assembly 48a is caused to initially accelerate when it begins to rotate from a rest position toward a cutting position, to decelerate as the cutting position is approached and then to again accelerate after the cutting assembly passes through the cutting position moving toward the next rest position. With this initial rapid movement of the cutting arms (98 and 100 of FIG. 2) into position beside a stalk to be cut, even fewer stalks adjacent to the stalk to be cut are likely to be damaged.

In order to cause the cutting assembly 48a to rotate through a one-half cycle each time a stalk is detected, the circumference of the sprocket 180 is constructed to be twice that of the control sprocket 184. It is obvious that each time the control sprocket 184 rotates, the sprocket 180 and thus the cutting assembly 48a is caused to rotate through one-half of a full cycle.

The power for causing the cutting assemblies to rotate is derived from the rotation of the wheels 8 as a result of the harvesting machine being towed behind a towing vehicle. As shown in FIG. 3, a sprocket 188 is coupled to a wheel 8 to rotate therewith and is coupled by way of a drive chain 190 to a drive sprocket 192. The drive sprocket 192 is journaled to rotate in the support member 10. A drive pulley 194, larger than the drive sprocket 192, is affixed to the sprocket 192 to rotate therewith. The drive pulley 194, in turn, is coupled by way of a belt 196 to two other pulleys 198 and 200. The sprocket 198 and 200 are rotatably coupled to a clutch mechanism 202 and 204, each of which control rotation of a different cutting assembly. Only clutch mechanism 202 will be described, it being understood that the other clutch mechanisms and associated apparatus operate in similar fashion. Clutch mechanism 202, in response to a signal from corresponding detecting apparatus, causes the shaft 186 to be driven by the pulley 198 to thereby cause the corresponding cutting assembly to rotate. Thus, the sprockets 188 and 192 and pulleys 194, and 198 rotate continuously at a speed determined by the ground speed of the harvesting machine. The control sprocket 184 is selectively caused to rotate in response to a stalk of the appropriate height being detected by the detecting apparatus 44a (FIG. 2).

The clutch 202 could be any conventional electromagnetic type clutch which engages in response to the presence of an electrical signal and disengages in response to the absence of an electrical signal. Other types of clutches might also be employed.

Figure 6A:
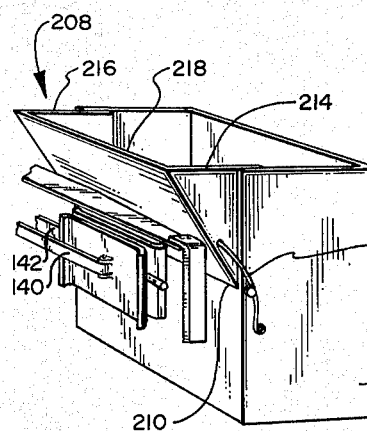
FIGS. 6A through 6C show perspective views of the stalk receiving and holding bin of the harvesting machine of FIG. 1 at various stages in the process of receiving a harvested stalk.
Figure 6B:
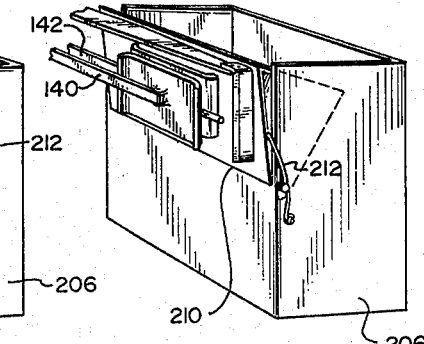
Figure 6C:
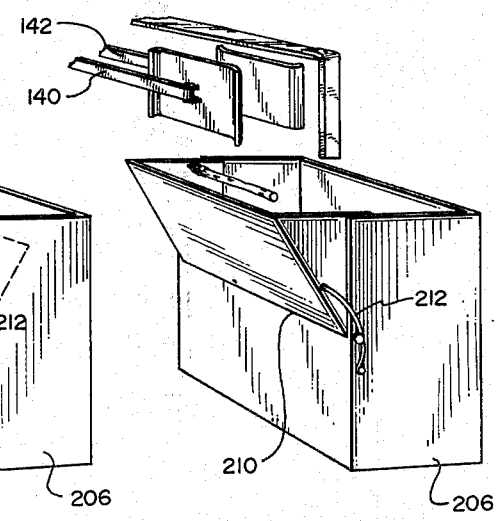

The stalk receiving and holding structures, shown schematically in FIGS. 1 through 3, are disposed in the pathways traversed by the cutting arms of the cutting assemblies and are adapted to receive the stalks harvested by the cutting assemblies. Exemplary stalk receiving and holding structure is shown in FIGS. 6A through 6C. This structure includes a bin 206 having four side walls and a bottom wall for receiving and holding the harvested stalks. On one side of the bin 206 is a swing chute 208 mounted to pivot about a generally horizontal axis 210 between a receive position, shown in FIGS. 6A and 6C, and a closed position, shown in FIG. 6B. The chute 208 is held open by a spring 212 so that the chute, unless forced to the closed position, remains in the receive position.

The chute 208 includes two side walls 214 and 216 which are fitted to slide along the interior surfaces of corresponding side walls of the bin 206 and an inclined front wall 218 joining front edges of the two side walls 214 and 216. The bottom edge of the front wall 218 defines the axis about which the chute 208 pivots. Any type of hinge arrangement may be used to connect the chute 208 to the bin 206 to allow the pivoting action described.

In operation, after a stalk is cut and grasped by the cutting assembly, the cutting arm and associated holding plate arms are rotated to a rest position as generally shown in FIG. 6A. When the cutting assembly is again actuated to rotate, the cutting arm and associated holding plate arms rotate upwardly to contact the front wall 218 of the chute 208 forcing the chute to pivot to the closed position and allowing the cutting arm and associated holding plates to pass thereby. This is shown in FIG. 6B. When the cutting arm and associated holding plate arms have rotated to a position above the chute 208, the chute is caused to return to the receive position by the spring 212 after which the camming tracks 154 and 156 of the cam 120 (FIGS. 4A and 4B) cause the holding plate arms 140 and 142 to move apart and release the stalk so that it falls into the chute 208 which then guides the stalk into the bin 206. This is accomplished by the camming tracks 154 and 156 forcing the camming fingers 150 and 152 together to thereby cause the holding plate arms 140 and 142 to move apart. As indicated in composite FIG. 6, all the harvested stalks are deposited in the bin 206 in the same orientation, i.e., so that the upper portions of the stalks all point in the same direction.

The stalk receiving and holding structure described is simple and yet serves the desired purpose of providing a retaining structure for the harvested stalks. The operation of rotating the cutting mechanism to sever the stalks also functions to enable depositing of the stalks in the stalk receiving and holding structure.

It is to be understood that the above-described arrangement is only illustrative of the application of the principles of the present invention. Numerous other modifications and alternative arrangements may be devised by those skilled in the art without departing from the spirit and scope of the present invention and the appended claims are intended to cover such modifications and arrangements.

What is claimed is:

1. A machine for harvesting crops which grow in stalks or the like comprising
a frame adapted to be moved along the ground,
means mounted on said frame for detecting stalks of a selected height and in a selected pathway,
a first cutting assembly mounted on the frame to selectively rotate downwardly toward the ground to a cutting position beside a selected stalk and then upwardly away from the cutting position, said cutting assembly including
cutting means movable to sever the selected stalk, and
means for grasping the severed stalk and elevating it as the cutting assembly rotates upwardly, and
means mounted on the frame and responsive to said detecting means for actuating said cutting assembly to rotate.

2. A machine as in claim 1 further comprising drive means mounted on the frame for causing said cutting assembly to accelerate as it begins to rotate toward the cutting position, to decelerate as it approaches the cutting position, and then to accelerate as it rotates away from the cutting position.

3. A machine as in claim 2 further comprising a first sprocket means mounted on the frame which, when rotated, causes said cutting assembly to rotate, and wherein said drive means comprises
a control sprocket means mounted to rotate eccentrically, and
a drive chain coupling the control sprocket means to the first sprocket means.

4. A machine as in claim 3 further comprising means mounted on the frame and responsive to the movement of said frame for causing said control sprocket means to rotate.

5. A machine for harvesting crops which grow in stalks or the like comprising
a frame adapted to be moved along the ground, and
a cutting assembly mounted on the frame to selectively rotate from a first rest position above the ground downwardly toward the ground to a cutting position beside a selected stalk and then upwardly in a generally vertical, cycloidal path to a second rest position above the ground, said cutting assembly comprising
cutting means movable to sever the selected stalk when the cutting assembly is in the cutting position, and
means for grasping the severed stalk and elevating it as the cutting assembly rotates upwardly, said grasping means including a pair of holding plates movable to positions on either side of a selected stalk when the cutting assembly is in the cutting position, and means for causing the holding plates to move toward each other to grasp the stalk as the cutting means severs the stalk.

6. A machine as in claim 5 wherein said cutting assembly includes an axle journaled on said frame to rotate about a horizontal axis and a cam fixed in said frame adjacent to said axle and including a first camming track having a shoulder in one portion thereof, and wherein said cutting means includes
an elongate cutting arm mounted at one end to said axle to pivot generally transversely of the direction of travel of the machine when the axle is rotated to the cutting position, said cutting arm including a cam follower portion which rides over the first camming track so that the cutting arm is caused to move transversely as the cam follower portion of the arm rides over the shoulder of the first camming track.
means for biasing the cutting arm to cause the cam follower portion of the arm to contact and ride over the first camming track, and
a cutting blade attached to the other end of said cutting arm for cutting the stalks.

7. A machine as in claim 6 wherein said cutting blade extends from one side of said cutting arm.

8. A machine as in claim 5 wherein said cutting assembly includes an axle journaled on said frame to rotate about a horizontal axis, wherein said causing means includes a cam fixed in said frame adjacent to said axle and including second and third camming tracks, and wherein said grasping means further includes
a first holding plate arm pivotally carried at one end by said axle, a first holding plate of said pair being mounted on the other end of said first holding plate arm,
a second holding plate arm pivotally carried at one end by said axle, a second holding plate of said pair being mounted on the other end of said second holding plate arm,
said first and second holding plate arms each including a cam follower portion which rides over said second and third camming tracks respectively so that the holding plate arms are maintained apart as the axle is rotated toward the cutting position and are caused to pivot toward each other when the axle reaches the cutting position to thereby grasp a stalk from either side thereof.

9. A machine as in claim 8 wherein said grasping means further includes means for biasing said first and second holding plate arms to cause the cam follower portions thereof to contact and ride over the second and third camming tracks respectively.

10. A machine as in claim 9 wherein said first and second holding plate arms are mounted to pivot about a common axis.

11. A machine as in claim 10 wherein said second and third camming tracks and said first and second holding plate arms are arranged to coact such that after said axle is rotated to the cutting position and the first and second holding plate arms are pivoted together, the holding plate arms are free to jointly pivot within a predetermined range in either direction about the common axis.

12. A machine as in claim 6 wherein said cutting arm is mounted on the axle so that the cutting blade is forced into the ground to cut the stalk below ground level as the cutting arm is pivoted.

13. A machine as in claim 6 wherein said cutting assembly further comprises means for controllably varying the distance through which the cutting arm pivots.

14. A machine as in claim 8 further comprising means mounted on the frame for receiving and holding the stalks, wherein the first and second holding plate arms are adapted to pass above the receiving and holding means as the axle is rotated toward the second rest position, and wherein the second and third camming tracks of said cam are adapted to cause the first and second holding plate arms respectively to pivot apart when the arms pass above the stalk receiving and holding means to thereby separate the first and second holding plates so that a stalk carried thereby falls into the receiving and holding means.

15. A machine as in claim 14 wherein said receiving and holding means comprises a bin having a swing chute on one side thereof movable between a receive position, in the pathway of the first and second holding plate arms and a closed position so that as the axle rotates toward the second rest position, the arms contact and urge the chute from the receive position to the closed position after which the chute returns to the receive position to catch a stalk released by the holding plates and guide it into the bin.

16. A machine as in claim 1 wherein said detecting means and said cutting assembly are positioned on said frame so that when a stalk of predetermined height is detected by the detecting means, the cutting assembly is caused to rotate to the cutting position beside the stalk as the frame moves along the ground.

17. A machine as in claim 16 further comprising means for varying the forward/rearward position of said detecting means with respect to the machine.

18. A machine as in claim 16 wherein said detecting means comprises
a detection arm mounted on said frame to pivot about a generally horizontal pivot axis between a rest position in which the arm is in a generally vertical disposition, and an actuate position in which the lower portion of the arm is pivoted rearwardly of the frame and the upper portion is pivoted forwardly, and
switch means responsive to said detection arm pivoting to the actuate position for signaling said actuating means.

19. A machine as in claim 18 wherein said detecting means further comprises balancing means for varying the distribution of weight of the detection arm with respect to the arm's pivot axis.

20. A machine as in claim 19 wherein said detection arm has a slot therein and wherein said balancing means comprises a weighted element positionable at various locations along the slot.

21. A machine as in claim 18 wherein said detecting means further comprises
biasing means for urging said detection arm to return to the rest position after the arm has been pivoted toward the actuate position, and
stop means for preventing the detection arm from pivoting beyond the rest portion from the actuate position.

22. A machine as in claim 18 wherein said switch means comprises a switch adapted to operate when subjected to a magnetic field, said switch being positioned near the path traversed by a portion of said detection arm as the arm is pivoted, and wherein said detection arm includes a magnet mounted on said portion of the detection arm so that when the detection arm is pivoted toward the actuate position, the magnet is moved near the switch to cause operation thereof.

23. A machine as in claim 18 wherein said detecting means further comprises a feeler plate mounted on the lower portion of said detection arm for contacting the stalks and adjustable transversely of the direction of travel of the machine.

24. A machine as in claim 1 further comprising a second cutting assembly mounted on the frame behind the first cutting assembly and wherein said frame includes a pair of vertically parallel bars for coupling the frame to a towing vehicle.

25. A machine as in claim 24 further comprising first and second support arms pivotally attached to said frame and coupled to the first and second cutting assemblies respectively to enable the cutting assemblies to be moved upwardly if they strike an object on the ground.

26. A machine as in claim 1 wherein said frame comprises a support member mounted to pivot generally upwardly, and wherein said cutting assembly is rotatably mounted in said support member so that when the support member is pivoted, the cutting assembly is carried upwardly.

27. A machine as in claim 1 further comprising parallel linkage means for coupling the frame to a towing vehicle and for maintaining the frame in a generally level disposition.

28. A machine for harvesting asparagus stalks and the like comprising
a frame having wheels thereon for supporting the frame and enabling the frame to be moved along the ground,
means mounted on said frame for detecting stalks of a selectable height and in a selectable pathway,
a cutting assembly comprising a hub mounted on the frame to rotate about a generally horizontal axis, a plurality of elongated cutting elements attached to and extending outwardly of the hub, said hub being positioned so that as it is rotated, the cutting elements move in a generally vertically disposed circular path to the ground at one side of said pathway, and means for causing each of said cutting elements to move laterally of the circular path toward said pathway at a predetermined position in the circular path, and
means responsive to said detecting means for actuating said cutting assembly to cause it to rotate.

29. A machine as in claim 28 further comprising means for enabling adjustment of said detecting means in the vertical, lateral and forward/rearward directions of the machine.

30. A machine as in claim 28 wherein said cutting assembly further comprises
a plurality of pairs of stalk holding member arms attached to and extending outwardly of the hub adjacent a corresponding cutting element,
a pair of stalk holding members, each mounted on a different one of said holding member arms, and
means for causing said holding member arms to move toward each other to grasp a stalk therebetween just as the corresponding cutting element cuts the stalk.

31. A machine for harvesting asparagus stalks and the like comprising
a frame having wheels thereon for supporting the frame and enabling the frame to be moved along the ground, a cutting assembly including a hub mounted on the frame to rotate about a generally horizontal axis, at least one elongated cutting arm pivotally mounted on and extending outwardly of the hub to rotate therewith in a generally vertical, cycloidal path from a first rest position downwardly toward the ground to a cutting position and then upwardly to a second rest position, and means for causing said cutting arm to move rapidly to cut a selected stalk when the cutting arm reaches a cutting position, drive means for causing said hub to rotate rapidly as the cutting arm is moved a portion of the distance from the first rest position toward the cutting position and then move slowly as the cutting arm is moved to the cutting position, and means mounted on said hub to rotate therewith for grasping and elevating the stalks as the stalks are cut by said cutting arm, said grasping means including a pair of plates movable to grasp the stalks from either side thereof as the stalks are cut.

32. A machine as in claim 31 further comprising a first sprocket means which, when rotated, causes said hub to rotate, and wherein said drive means comprises a control sprocket means mounted on said frame to rotate eccentrically, and a drive belt coupling the control sprocket means to the first sprocket means.

33. A machine as in claim 32 further comprising means mounted on said frame for detecting stalks of a predetermined height, and means responsive to said detecting means for actuating said drive means to cause the hub and cutting arm to rotate from the first rest position to the cutting position and then to the second rest position.

* * * * *